Dec. 15, 1959     K. H. SCHÜTZ ET AL     2,916,981
AUTOMATIC DEPTH-OF-FOCUS INDICATOR FOR PHOTOGRAPHIC OBJECTIVES
Filed June 12, 1957     2 Sheets-Sheet 1
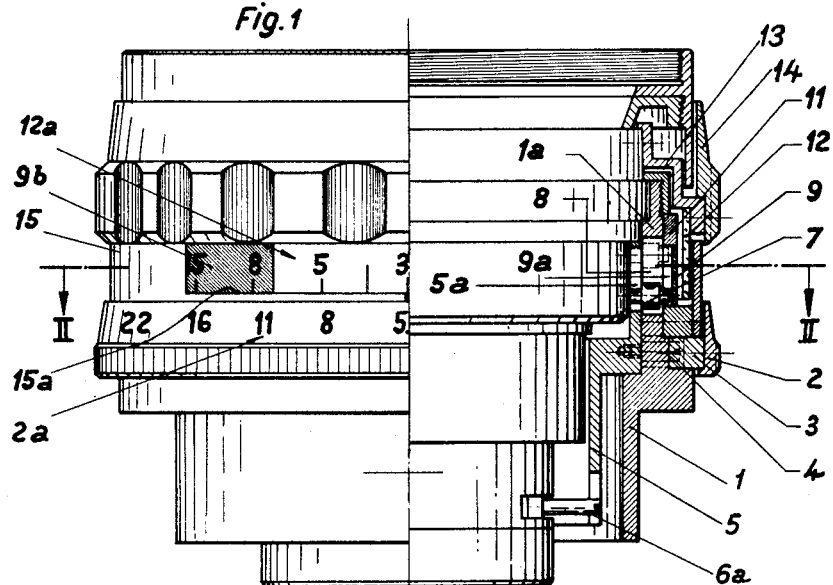
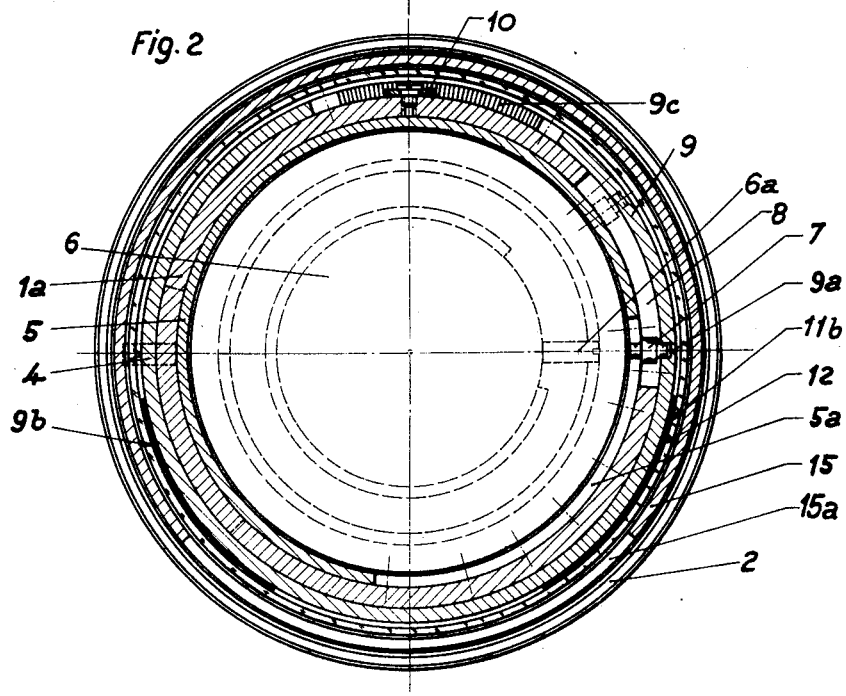
*Inventors:*
KARL HEINZ SCHÜTZ
FRANZ WERNER
BY *Karl F. Ross*
AGENT

United States Patent Office 2,916,981
Patented Dec. 15, 1959

2,916,981

AUTOMATIC DEPTH-OF-FOCUS INDICATOR FOR PHOTOGRAPHIC OBJECTIVES

Karl Heinz Schütz, Kreuznach, Rhineland, and Franz Werner, Munster-Sarmsheim, Rhineland, Germany, assignors to Jos. Schneider & Co., Optische Werke, Kreuznach, Rhineland, Germany, a German firm Application June 12, 1957, Serial No. 665,204

Claims priority, application Germany June 30, 1956

6 Claims. (Cl. 95—64)

Our present invention relates to mechanism for automatically indicating the depth of focus (or depth of field) in a photographic objective, especially one of the central-aperture type wherein the axial displacement of a lens barrel for focusing purposes is controlled by a rotatable element to which it is connected by screw threads.

The depth of focus or field, as is well known, is that range of distance both forwardly and rearwardly from the selected focusing distance throughout which satisfactory definition of the projected image is obtained. Given a blur circle of constant diameter, the extent of this range is determined by the focal length of the objective and, in addition, varies inversely with the relative aperture thereof, being larger for the smaller diaphragm openings and vice versa. It is, therefore, desirable to have means for correlating each diaphragm stop with the corresponding field range.

Earlier arrangements designed to provide the desired depth-of-focus indications include, for example, a special indicator ring bearing engravings or colored markings by means of which the focusing range corresponding to each diaphragm setting can be read on the adjacent scale of the distance indicator. This arrangement lacks the required accuracy in the case of objectives of great focal length, where the limits of the focusing range are close together, and also in those instances where the distance scale cannot be conveniently equipped with suitable reference lines.

Improvements over these prior systems have been disclosed in our individual co-pending applications Ser. No. 373,326, filed August 10, 1953, by Franz Werner, and Ser. No. 621,492, filed November 8, 1956, by Karl Heinz Schütz, both owned by the assignee of our present application. The Werner application discloses the use of two oppositely rotatable indicator rings, coupled together for rotation in opposite directions about the optical axis of a lens barrel, which carry respective markers adapted to show the depth of field on an associated distance scale when the rings are displaced under the control of a diaphragm-setting member. In the Schütz application a further refinement of this arrangement is provided according to which the markers are in the form of darkly colored ring segments which obscure, but do not completely block out, the distance markings on a transparent or translucent annular scale carrier concentrically surrounding the indicator rings; as a result, the distance scale may be conveniently read even if the two markers are close together. The externally positioned scale carrier also constitutes a seal to protect the indicator mechanism against dust or moisture.

In each of the two above-identified applications the rotation of the diaphragm-setting member is communicated to the indicator rings through the intermediary of a cam disk having a peripheral ridge upon which a spring-loaded cam follower is constrained to ride, the cam follower acting upon a pinion meshing with toothed segments of these rings. It is an object of our present invention to provide a more positive coupling between the depth-of-focus indicator mechanism and the diaphragm-setting means. Other objects of the invention are to provide a more compact, mechanically simpler and relatively rugged arrangement of the character set forth.

In accordance with our invention, we provide a rotatable annular element concentrically juxtaposed with a stationary annular element, the two elements being formed with peripheral cam slots whose point of intersection varies both axially and angularly as the rotatable element is displaced under the control of the diaphragm-setting member of the objective. A guide pin, traversing the two slots in a radial direction, is thus displaced both axially and angularly as the rotatable annular element is entrained by the diaphragm-setting member, this pin playing in a narrow axial slot of an indicator ring to which it thus transmits the angular component of its movement. A second indicator ring is coupled with the first ring, for movement in the opposite sense, by suitable transmission means such as a pinion meshing with toothed segments of the two rings.

The invention will be described in greater detail with reference to the accompanying drawing in which:

Fig. 1 shows a photographic objective, embodying the invention, partly in view and partly in axial section;

Fig. 2 is a cross-sectional view taken on the line II—II of Fig. 1; and

Figure 3:
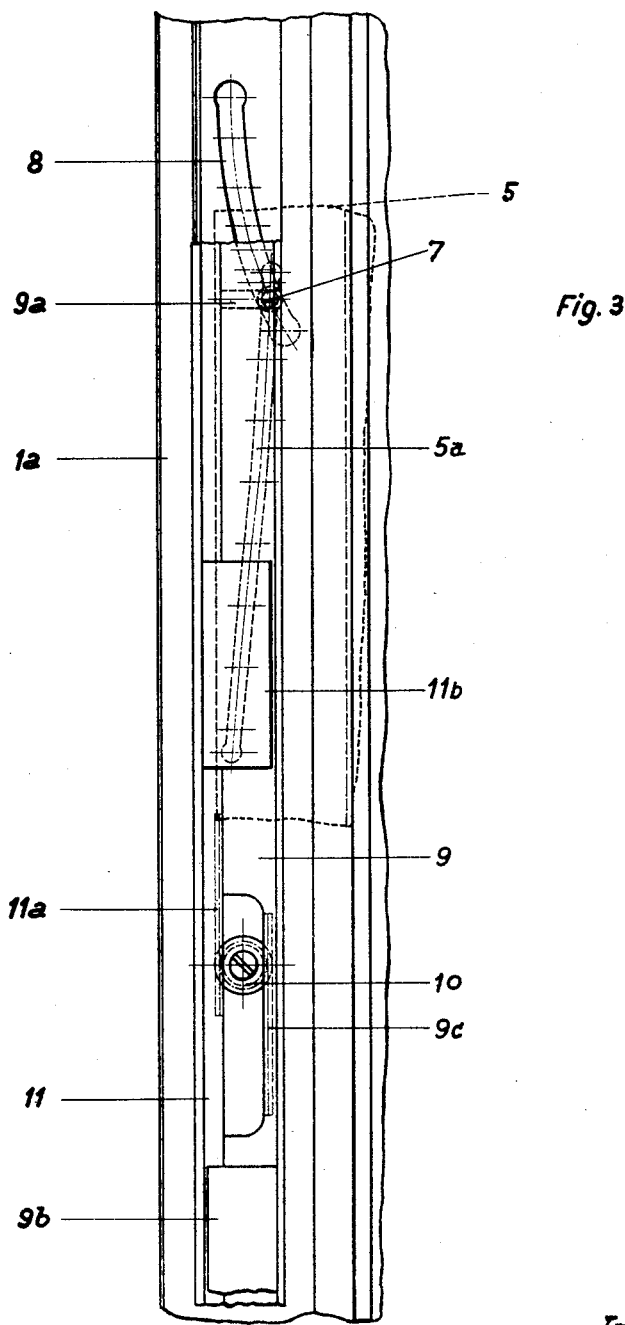
Fig. 3 shows the range-indicating mechanism of the objective in developed form.

The drawing shows at 1 a cylindrical objective housing provided with a tubular extension 1a on which there is rotatably supported, through the intermediary of an annular insert 3, a ring 2 bearing a diaphragm scale 2a. Rings 2 and 3, together representing a diaphragm-control member, are coupled via a threaded bolt 4 with the setting sleeve 5 adapted to operate the iris leaves (not shown) of a diaphragm, located within a lens barrel 6, by means of a threaded bolt 6a.

In accordance with our invention there is provided in the periphery of sleeve 5 a cam slot 5a, best seen in Fig. 3, extending generally along a helicoidal line. A second cam slot 8 is formed in the fixed supporting member 1a and extends generally along a helicoidal line having a pitch opposite to that of slot 5a. The two slots are radially traversed at their intersection by a pin 7 having a large-diameter central portion received in slot 8 and a reduced left-hand extremity (as viewed in Figs. 1 and 2) received in slot 5a. The opposite (right-hand) extremity of pin 7, likewise of reduced diameter, plays in an axially extending peripheral slot 9a of an indicator ring 9 which carries a darkly colored (e.g. red) segmental marker 9b. A toothed segment 9c of indicator ring 9 meshes with a pinion 10 which in turn engages a toothed segment 11a of a second indicator ring 11, the latter carrying a darkly colored segmental marker 11b. It will be apparent that the pin 7 is held in position by the imprisonment of its enlarged central portion between sleeve 5 and indicator ring 9.

A light-transmissive (transparent or translucent) outer ring 12 bears a distance scale 12a whose graduation is visible against a contrasting background through a window 15a formed in a ring 15, the latter being rigid with the housing 1, 1a. Ring 12 is rotatable in its housing, through the intermediary of a supporting ring 13, by means of a focusing ring 14 whose rotation serves to displace the lens barrel 6 in axial direction, relatively to the housing, via a threaded connection (not shown) in a manner well known per se. It will be seen that the annular members 1, 1a, 2, 3, 5, 6, 9, 11, 12, 13, 14 and 15 are all coaxial with one another, their common axis being the optical axis of the system.

In operation, the scale-bearing diaphragm-control ring 2 is rotated to adjust the iris leaves of the diaphragm in lens barrel 6 to a position corresponding to a desired aperture, as read on the scale 2a, this movement causing a rotation of cam slot 5a relative to cam slot 8 so as to shift the point of intersection of these slots both axially and radially. This imparts a similar compound displacement to pin 7; the axial component of this displacement, occurring within slot 9a, is without effect yet its angular component results in a corresponding rotation of indicator ring 9 along with an opposite rotation of indicator ring 11. The consequent relative displacement of marker segments 9b and 11b partially obscures, but does not hide, the graduations of scale 12a so that the depth of focus (e.g. as predetermined mathematically or by observation) may be read directly on that scale.

It will be noted that, in the arrangement illustrated, the cam slot 5a has a relatively short pitch so that a large angular movement of members 2, 3 and 5 is required for a comparatively small rotation of the indicator rings 9 and 11. It will be appreciated, however, that the pitch of either slot 5a, 8 may be varied at will, in order to produce a desired rate of displacement, and that a slot 5a of steeper configuration (e.g. similar to that of slot 8 as illustrated) would increase the speed of the indicator rings relative to the setting unit 2, 3, 5. These and other modifications of the system herein disclosed will readily occur to persons skilled in the art and are intended to be embraced within the scope of our invention as defined in the appended claims.

We claim:
1. In a photographic camera objective, in combination, a support, an axially displaceable lens carrier on said support provided with diaphragm-adjusting means, a rotatable diaphragm-setting member on said support operatively coupled with said diaphragm-adjusting means, a first annular element positively coupled with said member for rotative entrainment thereby, a second annular element rigid with said support and coaxial with said first element, said elements being provided with respective cam slots intersecting each other and extending generally along helicoidal lines, a first and a second indicator ring coaxial with said annular elements and rotatably mounted on said support, said first indicator ring being provided on its periphery with an axially extending guide slot, a pin floatingly traversing all of said slots substantially in raidal direction of said indicator rings, thereby translating a rotative displacement of said diaphragm-setting member into a rotation of said first indicator ring at a different speed, coupling means interconnecting said indicator rings for rotation in opposite directions relative to said support, a focusing ring coaxial with said indicator rings rotatably mounted on said support and operatively coupled with said lens carrier for axially displacing the latter, said focusing ring bearing a distance scale, and a pair of depth-of-focus markers respectively carried on said indicator rings and positioned for co-operation with said distance scale.

2. The combination according to claim 1, wherein said indicator rings are provided with gear teeth, said coupling means comprising a pinion meshing with the gear teeth of both of said indicator rings.

3. The combination according to claim 1, wherein said cam slots extend along lines of opposite pitch.

4. The combination according to claim 3, wherein the pitch of one of said cam slots is substantially shorter than that of the other cam slot.

5. The combination according to claim 1, wherein said first indicator ring concentrically surrounds said annular elements, the cam slot of the annular element nearer to said first indicator ring being wider than the other cam slot and said guide slot, said pin having an enlarged central portion received in said wider cam slot.

6. The combination according to claim 5, wherein said second annular element is positioned next to said first indicator ring.

References Cited in the file of this patent
UNITED STATES PATENTS

| | | |
|---|---|---|
| 1,174,014 | Clark et al. | Feb. 29, 1916 |
| 2,254,537 | Nerwin | Sept. 2, 1941 |
| 2,315,977 | Mihalyi | Apr. 6, 1943 |
| 2,342,819 | Priesemann | Feb. 29, 1944 |
| 2,350,009 | Babcock et al. | May 30, 1944 |
| 2,527,106 | Smith | Oct. 24, 1950 |

FOREIGN PATENTS

| | | |
|---|---|---|
| 756,693 | Great Britain | Sept. 5, 1956 |
| 926,768 | Germany | Apr. 25, 1955 |
| 1,101,019 | France | Apr. 13, 1955 |